(12) United States Patent
Lanzatella et al.

(10) Patent No.: US 6,883,081 B2
(45) Date of Patent: Apr. 19, 2005

(54) STORAGE MANAGEMENT SOFTWARE BRIDGES

(75) Inventors: Thomas W. Lanzatella, Minneapolis, MN (US); John A. Colgrove, Los Altos, CA (US); Blaine T. Cuykendall, San Jose, CA (US); Allen Unueco, Bellevue, WA (US); Graham Bromley, Dublin, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 223 days.

(21) Appl. No.: 10/208,559

(22) Filed: Jul. 30, 2002

(65) Prior Publication Data

US 2004/0024984 A1 Feb. 5, 2004

(51) Int. Cl.[7] .............................................. G06F 12/00
(52) U.S. Cl. ........................... 711/202; 711/6; 711/154; 711/156; 711/170; 709/203; 709/223; 709/226; 709/229; 707/1; 707/10; 707/102; 707/205
(58) Field of Search ............................. 711/6, 154, 156, 711/170, 202; 709/203, 223, 226, 229; 707/1, 10, 102, 205

(56) References Cited

U.S. PATENT DOCUMENTS

| | | | |
|---|---|---|---|
| 5,991,542 A | 11/1999 | Han et al. | .................... 395/712 |
| 6,029,168 A | 2/2000 | Frey | ............................. 707/10 |
| 6,260,127 B1 * | 7/2001 | Olarig et al. | ................ 711/167 |
| 6,389,432 B1 * | 5/2002 | Pothapragada et al. | ..... 707/205 |
| 6,640,278 B1 * | 10/2003 | Nolan et al. | .................... 711/6 |
| 6,640,282 B1 * | 10/2003 | MacLaren et al. | .......... 711/115 |
| 2002/0073268 A1 * | 6/2002 | Peloquin et al. | ................ 711/6 |

OTHER PUBLICATIONS

"Storage Area Networking—High–Speed Data Sharing Among Multiple Computer Platforms", *Tivoli Systems, Inc.*, Copyright 2000, http://www.tivoli.com/products/documents/whitepapers/san_datasharing_wp.pdf, (2000), 4 pages.

"Storage Management—Best Practices", *Copyright 2001, IBM Corp.*, http://www.tivoli.com/products/documents/whitepapers/wp–storage–bp.pdf, (2001), 11 pages.

Amiri, Khalil S., "Scalabale and manageable storage systems", *Ph.D. Thesis, Dept. of Electrical and Computer Engineering, Carnegie Mellon University, Pittsburgh, PA*, http://www.pdl.cmu.edu/PDL–FTP/NASD/amiri_thesis.pdf,(Dec. 2000),i–241.

Wylie, Jay J., "Selecting the Right Data Distribution Scheme for a Survivable Storage System", *Research Paper, School of Computer Science, Carnegie Mellon University, Pittsburgh, PA*, http://www.pdl.cmu.edu/PDL–FTP/Storage/CMU–CS–01–120.pdf,(May 2001), pp. 1–21.

\* cited by examiner

Primary Examiner—Donald Sparks
Assistant Examiner—Bao Q Truong
(74) Attorney, Agent, or Firm—Meyerston Hood Kivlin Kowert & Goetzel, P.C.; B. Noël Kivlin (57) ABSTRACT

Methods and systems to bridge storage management software are provided. A first storage management application communicates with a host and performs an analysis of a storage environment associated with the host. The first storage management application uses the analysis to determine if a storage resource interface is controlled by a second storage management application, and if so a plugin application is accessed by the first storage management application to permit the second storage management application to perform a storage management operation on behalf of the host. In one embodiment, the analysis is updated by the first storage management application upon receiving results from second storage management application, where the results reflect the processing of the storage management operation by the second storage management application.

20 Claims, 4 Drawing Sheets

STORAGE MANAGEMENT SOFTWARE BRIDGES

CROSS-REFERENCE TO RELATED APPLICATIONS

This application is related to the following co-pending, commonly assigned U.S. patent applications: "Methods, Functional Data, and Systems to Represent a Storage Environment," Ser. No. 09/997,602 filed Nov. 29, 2001; "Methods and Systems to Backup Data," Ser. No. 10/086,597, filed Feb. 28, 2002; "Methods, Systems, and Apparatus to Interface with Storage Objects," Ser. No. 09/997,612 filed Nov. 29, 2001; "Systems, Methods, and Apparatus for Creating Stable Disk Images", Ser. No. 10/087,230 filed Feb. 28, 2002; "Methods and Systems to Interface Storage Objects," Ser. No. 09/997,350, filed Nov. 29, 2001; "Storage Resource Integration Layer Interfaces," Ser. No. 10/175,029, filed Jun. 18, 2002; and "Storage Snapshot Services and Systems," Ser. No. 10/194,524, filed Jul. 11, 2002; each of which is herein incorporated by reference in its entirety.

COPYRIGHT NOTICE/PERMISSION

A portion of the disclose of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software descriptions/examples, and data as described below and in the drawings hereto: Copyright© 2002, VERITAS Software Company., All Rights Reserved.

FIELD OF THE INVENTION

The present invention is related to software bridges, and more particularly to methods and systems that bridge storage management services in a shared storage environment.

BACKGROUND INFORMATION

Storage networking is the practice of connecting storage devices to computing devices (e.g., clients, servers, and the like) by using networks (e.g., Fibre Channel) instead of traditional point-to-point small computer system interface (SCSI) channels. A network used to connect servers to storage devices is referred to as a storage area network (SAN). Within a SAN environment, computing devices have access to the available storage devices. This presents a wide variety of benefits, including server platform fail-over wherein a failed storage device and failed server are automatically recovered by another operational server platform and operational storage device without requiring any recabling of the operational storage devices.

Prior to the development of SAN technology, local and wide area networks provided access between computing devices that did not always include storage devices. Connections were established with network protocols such as Transmission Communication Protocol (TCP), Unreliable Datagram Protocol (UDP), and others. These protocols ensure that message ordering is preserved and that messages are not lost. Distributed File Systems (DFS) such as network file system (NFS) and Common Internet file system (CIFS) are layered on top of network protocols. Distributed File Systems provide uniformed named access to files and their associated data storage devices across a network consisting of heterogeneous computing devices. The computing devices are typically organized as clients and servers, in a client-server architecture. Using DFS, access to files or data storage devices (e.g., storage resources) is transparent to the computing device. Thus, access is consistent across the DFS without the need for physical locations or other details associated with any particular file or data.

Client and/or server transparent access to storage resources entails interposing a storage management software application between the storage resources and the clients and/or servers, such that virtualization of the storage environment and storage resources can be made available to the clients and servers within the shared storage environment. For example, a Volume Manager (VM) application can intercept client or server application requests to access and perform operations against a storage resource within the shared storage environment, where the VM translates the request into lower levels of abstraction that are necessary to satisfy the requests on the storage resource. Moreover, when the requests are satisfied, results associated with processing the requests can be translated into higher levels of abstraction and communicated back to the client or server. The process of translating storage requests from high levels of abstraction to lower levels of abstraction can be referred to as virtualization.

Virtualization permits storage resources to be more effectively managed and controlled in a shared storage environment, where multiple clients and/or servers simultaneously access the storage resources of the shared storage environment. In this way, the details of the underlying storage environment are hidden from or transparent to the client and/or server applications accessing the storage resources. Thus, the storage resources are more beneficially controlled and managed for improved performance and throughput by the storage management applications that are interposed between the client and/or server applications and the storage resources.

Yet, providing a single storage management application to the clients and servers creates awkward implementations of the storage management application because the storage management application must be capable of interfacing with a variety of vendor provided interfaces associated with disparate storage resources that may comprise the shared storage environment. Consequently, managing a shared storage environment on a client or server can require a variety of storage management applications, rather than a single, unifying storage management application where each of the storage management applications can be capable of performing similar storage management operations. Conventionally, in shared storage environments where multiple storage management applications exist, the individual storage management applications do not effectively communicate with one another, resulting in excessive administrative overhead and insufficient application coverage of the storage environment.

Moreover, in order to effectively utilize multiple storage management applications in a shared storage environment on behalf of clients and/or servers, the interactions between the individual storage management applications should be transparent to the clients and/or servers that are accessing storage resources in the shared storage environment. Furthermore, each individual storage management application needs to effectively communicate data among themselves, such that the overall management and control of the shared storage environment is not eroded or degraded.

Typically, storage management applications are integrated into the shared storage environment by developing interfaces for each of the storage resources within the shared storage environment. Thus, each of the storage management applications is capable of directly interfacing with the storage resources. Yet, each of the developed interfaces is customized for each of the storage management applications. Therefore, an abundance of redundant interfaces is created. Accordingly, it is would be more desirable to rely on a single storage management application having existing, developed interfaces to some of the storage resources. This will facilitate the development and integration of new storage management applications, without being required to define new storage resource interfaces for the new storage management applications.

Therefore, what is needed are methods and systems for bridging the interfaces provided by storage management applications to interfaces of other, new or existing storage management applications. As one of ordinary skill in the art will understand upon reading the present disclosure, this will improve storage resource management within the shared storage environment and will reduce the overall software coding complexity of the individual storage management application processing within the shared storage environment. Furthermore, new storage management applications can more easily be integrated and become operational within the shared storage environment.

SUMMARY OF THE INVENTION

According to one aspect of the present invention, a method to bridge storage management applications is provided. A request to perform a storage management operation is received by a first storage management application from a host. The first storage management application performs one or more analysis operations on a storage environment associated with the storage management operation. The storage management operation is then passed from the first storage management application to a second storage management application using an interface associated with the second storage management application. The second storage management application performs the storage management operation on one or more storage resources included in the storage environment on behalf of the first storage management application.

According to another aspect of the present invention a method to bridge storage management applications is presented. A request is received from a host interface to perform a storage management operation on a storage resource. The host communicates with a first storage management application using the host interface. A mapping of a storage environment housing the storage resource is produced, where the mapping is produced by the first storage management application. Next, the first storage management application determines that an interface to perform the storage management operation is controlled by a second storage management application, and the first storage management application uses a second storage management application interface to communicate the storage management operation to the second storage management application. Furthermore, results are received from the second storage management application when the second storage management application processes the storage management operation on the storage resource. The results are received by the first storage management application, and the first storage management application uses the results to generate the mappings of the storage environment.

According to still another aspect of the present invention, a storage management bridging system is described. The storage management bridging system includes a host, a first storage management application that communicates with the host, a second storage management application that communicates with a storage resource interface associated with a storage resource, and a plugin application. The plugin application is used by the first storage management application to access the second storage management application on behalf of the host. The plugin application permits the first storage management application to cause the second storage management application to access the storage resource interface to perform a storage management operation requested by the host

DESCRIPTION OF THE PREFERRED EMBODIMENTS

In the following detailed description of various embodiments of the present invention, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

As used herein "storage resource" refers to one or more physical storage devices such as whole storage arrays, pieces of storage arrays, storage disks, communication ports, Logical Unit Numbers (LUNs) assigned to communication ports, Access Control Lists (ACLs), Host Bus Adapters (HBAs), Just a Bunch of Disk (JBOD), and the like. Furthermore, storage resources can include logical storage resources such as virtual storage disks assigned by the storage arrays, bindings, and the like. The storage arrays typically include front-end adapter interfaces that are accessible to a host to access the storage resources and back-end adapter interfaces that the storage array uses to control the storage resources directly. The back-end adapter interfaces are provided with the storage array by the vendor associated with the storage array. Conventionally, the back-end adapter interfaces are vendor specific.

Some storage resources are controlled at a lower implementation level by storage arrays. Storage arrays can include storage resources, software (e.g., native storage array provided back-end adapter interfaces) to access the storage resources, controllers, memory, power supplies, and the like. In some cases, a storage array can be a storage appliance that presents itself on a Fibre Channel, iSCSI, Infiniband or direct-attached SCSI network. Furthermore, a storage array can be a high-density or blade server. Additionally, a storage array can sometimes be designated a host, and a host can be designated as a storage array depending upon the operations being performed on the storage array or the host at any particular moment. Similarly, under some conditions, a host can be designated a storage appliance. A host can also be a client or a server and can include a number of applications that permit the host to communicate with other resources and applications within a network.

A storage management application is one or more sets of executable instructions that intercept storage management requests made by a host or another storage management application, and translates or performs an analysis on a shared or unshared storage environment of the host in order to satisfy the storage management requests. One type of storage management application is a Volume Manager (VM) application; other types of storage management applications can provide a logical mapping of the host's shared or unshared storage environment. Still other storage management applications can provide canonical or normalized front-end adapter interfaces that are accessible to other storage management applications in order to access disparate back-end adapter interfaces associated with disparate storage arrays (e.g., storage resources).

Storage management requests made by hosts can be associated with one or more storage management operations. Storage management operations can include operations to acquire the properties or configuration settings of a storage resource, operations to perform frozen image services, such as establish operations, split operations, and restore operations, and others. Moreover, storage management operations can be used to provide frozen images of storage data that is associated with a storage resource, such as is necessary when performing backup storage management operations or decision support operations.

Figure 1:
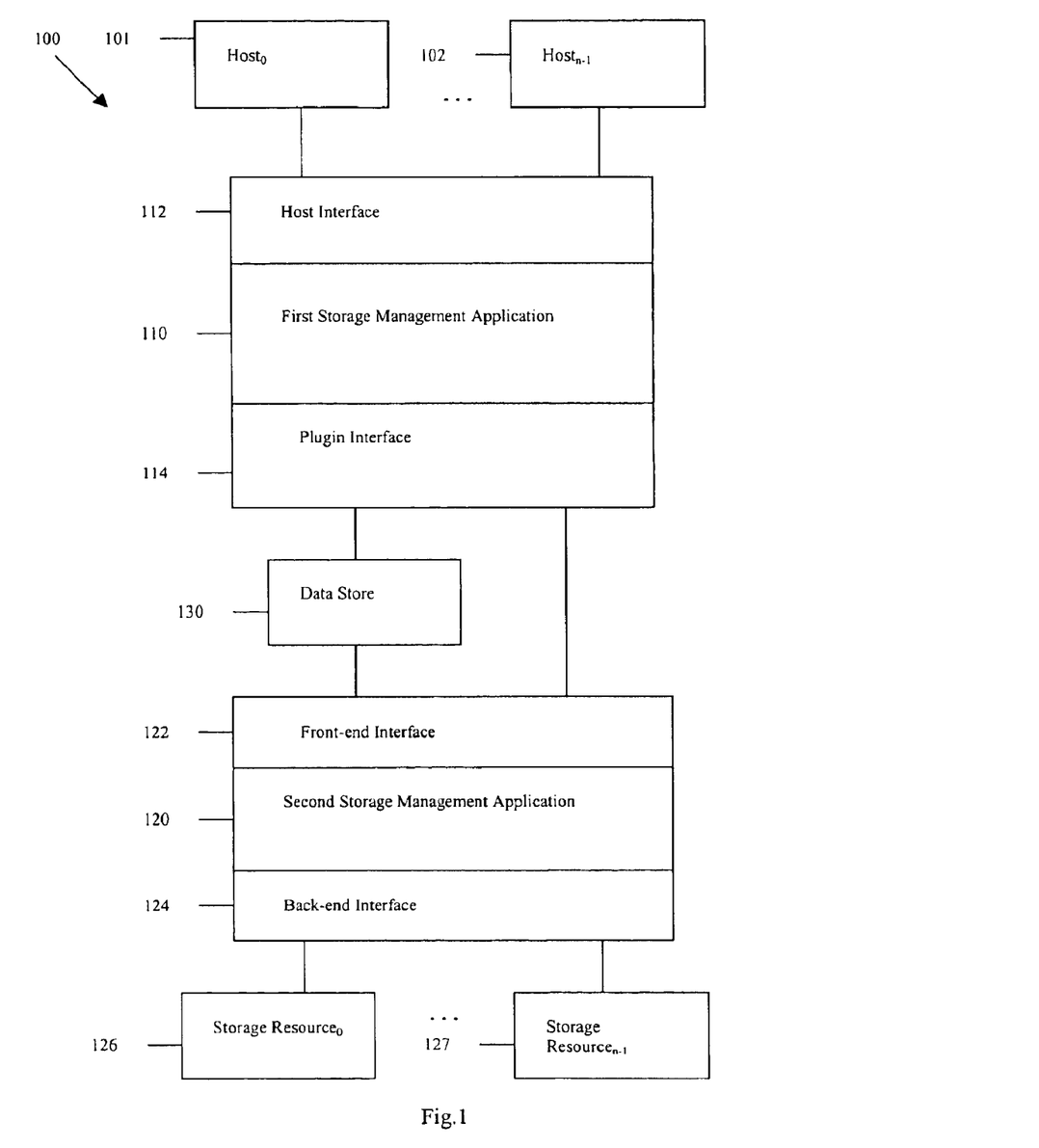
FIG. 1 shows a diagram of a storage management bridging system, according to the teachings of the present invention.

FIG. 1 illustrates a diagram of one storage management bridging system 100, according to the teachings of the present invention. The storage management bridging system 100 includes a plurality of hosts (e.g., 101–102), a first storage management application 110 that includes a host interface 112 and a plugin interface 114. In some embodiments, the host interface 112 is an Application Programming Interface (API) library used by the hosts 101–102 in order to make storage management requests representing one or more storage management operations. Furthermore, the storage management bridging system 100 includes a second storage management application 120 that has a front-end interface 122 and a back-end interface 124

The storage management operations are directed to accessing one or more storage resources (e.g., 126 or 127). Moreover, the hosts 101–102, the first storage management application 110, the second storage management application 120, and the storage resources 126–127 are networked together and participate in shared storage environment. In some embodiments the shared storage environment is SAN environment, and in other embodiments the shared storage environment uses TCP/IP with iSCSI. Of course, as one of ordinary skill in the art readily appreciates, any shared storage environment configuration and/or network can be used with the tenets of the present disclosure.

The first storage management application 110 performs analysis on the shared storage environment of the hosts' 101–102. In one embodiment, the analysis is achieved using a series of operations that provides private information and details about the storage resources 126–127. Moreover, additional storage resources may exist at higher levels of abstraction than the storage resources 126–127 depicted in FIG. 1. The first storage management application 110 is capable of providing an analysis for all such storage resources at any level of abstraction. The analysis can provide a mapping of the storage resources or storage data of a host (e.g., 101 or 102). The mapping provides the host (e.g., 101 or 102) with a true depiction of the underlying storage in the storage environment as it resides on logical or physical storage resources within the storage environment. As one of ordinary skill in the art readily appreciates, the mapping can be used to accomplish a number of storage management operations for the hosts 101–102. For example, the mapping can be used to create a frozen image of storage, as a basis for information used by a Storage Resource Management application, or to perform backup operations.

Additionally, the mapping permits the hosts 101–102 to more intelligently perform storage management operations. For example, the mapping can permit a Storage Resource Management application operational on the host (e.g., 101 or 102) to detect when storage devices (e.g., 126 or 127) share access to the hosts 101 and 102. As a result, a fail-over scenario, where failure of a host 101 results in the adoption by host 102 of host 101 primary storage is enabled.

As the first storage management application 110 performs the analysis of the storage environment, the first storage management application 110 can detect one or more storage resources (e.g., 126 and/or 127) that are identified and controlled by the second storage management application 120. Under these conditions, the first storage management application 110 accesses a plugin application from the plugin interface 114 that is associated with the second storage management application 120. This plugin application provides access to the second storage management application 120 through the front-end interface 122. The front-end interface 122 can also be an API library that is provided with the second storage management application 120. The front-end interface 122 is a canonical or normalized interface used by the second storage management application 120 to present a consistent and stable interface to access storage resources 126–127 controlled by the second storage management application 120.

The second storage management application 120 then translates or converts the call from the front-end interface 122 to a back-end interface 124. The back-end interface includes a series of disparate interfaces, where each disparate interface is associated with a native interface of the storage resource (e.g., 126 or 127). For example, in some embodiments the storage resources 126–127 are storage arrays, where each storage array includes a proprietary interface that is used to access the storage arrays. Different vendors of the storage arrays provide the proprietary interfaces. Thus, the second storage management application 120 presents a single interface calling procedure and format through the front-end interface 122 for storage arrays having proprietary interfaces.

In a particular embodiment, a host (e.g., 101 or 102) makes a request through the host interface 112 of the first storage management application's 110 to generate a frozen image of storage associated with the one of the storage resources (e.g., 126 or 127). The first storage management application 110 first performs an analysis on the storage environment producing a mapping of the storage environment. At some point during the production of the mapping, the first storage management application 110 detects the storage resource (e.g., 126 or 127) and the association with the second storage management application 120. As a result, the first storage management application 110 accesses the plugin interface 114, to acquire an appropriate plugin application that translates the frozen image request into a format recognized by the front-end interface 122 of the second storage management application 120. The second storage management application then translates the front-end interface 122 request into the appropriate back-end interface 124 request necessary to perform the frozen image operation using the native interface of the appropriate storage resource (e.g., 126 or 127).

The frozen image operation is then processed on the storage resource (e.g., 126 or 127) and the results passed back to the second storage management application 120. In some embodiments, the results are stored in a data store 130 or another data structures (not shown in FIG. 1) that can be accessed by the plugin interface 114. The results can be, property information associated with storage resources 126–127, or new mapping information and/or links to newly created or modified storage resources. The first storage management application 110 uses the results to update, if necessary, the mappings performed during the initial analysis of the storage environment by the first storage management application 110. Additionally, any updates (or properties as the case may be) are communicated to the host (e.g., 101 or 102) through the host interface 112 of the first storage management application 110. Of course, as one of ordinary skill in the art readily appreciates, the results could also be communicated from the second storage management application 120 through the front-end interface 122 to the first storage management application 110 via the plugin interface 114.

In some embodiments, the plugin interface 114 includes a series of plugin applications that support the acquisition of properties associated with and status of storage resources, the verification of storage management operations (e.g., splits and establishes), and the acquisition of frozen image techniques being used by the storage resources. Of course a variety of additional plugin applications can be developed to provide a bridge from the features of the first storage management application 110 to features associated with the second storage management application 120. All such bridges are intended to fall within the scope of the present disclosure.

Figure 2:
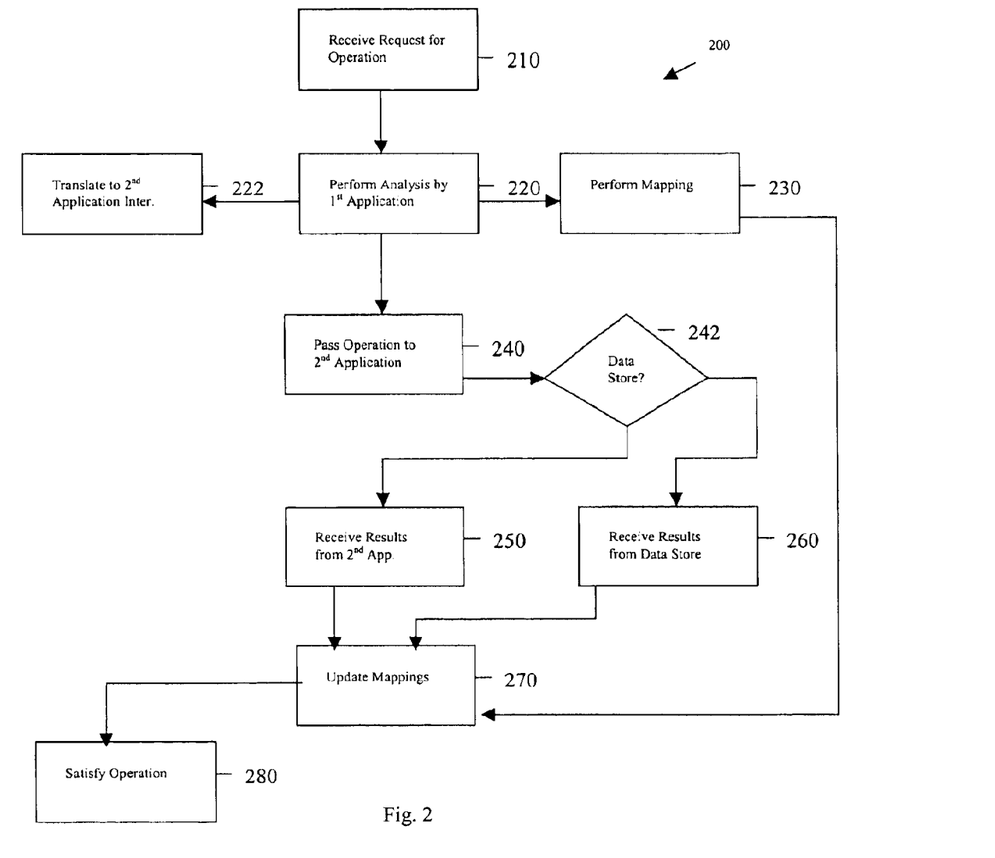
FIG. 2 shows a flowchart of a method to bridge storage management applications, according to the present invention.

FIG. 2 illustrates a flowchart of one method 200 to bridge storage management applications according to the present invention. Initially, a request is received in 210 to perform a storage management operation. The host makes the request and is in communication with the first storage management application. This request is received or intercepted by a first storage management application. Upon receipt of the storage management operation, the first storage management application performs one or more analysis operations in 220 on a storage environment associated with the storage management operation. In 230, the analysis operations provide a mapping of the storage environment. This mapping identifies the various storage resources included within the storage environment and their corresponding relationships to one another within the storage environment.

Next, in one embodiment, the storage management operation is identified by the first storage management application as being associated with a second storage management application. Thus, the storage management operation is translated in 222 to a second interface, communicates to the second storage management application. In some embodiments, the second interface is a plugin application used by the first storage management application to communicate in a syntax and format understood by the second storage management application. In 240, the storage management application is passed from the first storage management application to the second storage management application. The second storage management application then translates the storage management operation into one or more operations native to one or more storage resources being managed by the second storage management application. As a result, the second storage management application performs the storage management operation thereby on the one or more storage resources. In this way, the original request made by the host to perform a storage management operation through the first storage management application is actually executed by the second storage management application through the plugin application bridge established between the first and second storage management applications.

In some embodiments, the communication between the first and second storage management applications can be achieved using a data store (e.g., database, data warehouse, and others) or through any data structure known and accessible to both the first and second storage management applications. Correspondingly, in 242 a check is made to determine if communications between the first and second storage management applications are being made through a data store, or data structure as the case may be. If no such data store or data structure is being used, then the results associated with performing the storage management operation are received directly by the second storage management application from the first storage management application in 250. Again, the results can be received by the second storage management application through a plugin application. Alternatively, if a data store or data structure is being used to communicate results from the processing of the storage management operations, then in 260 the results are received by the first storage management application through the data store or data structure.

In 270, the results are used by the first storage management application to update the originally created mappings of the storage environment, if the storage management operation affected the mappings of the storage environment. In some cases, the mappings will not be affected, such as when the storage management operation is associated with acquiring status information from the storage resources, or acquiring property/configuration information from the storage resources.

Once the mappings have been updated, if necessary, then the original host request and the associated storage management operation are satisfied in 280. And, the results or new mappings can be communicated by the first storage management application to the host.

In one example embodiment of the processing for method 200, the second storage management application manages the interfaces associated with storage resources that are storage arrays. The second storage management application provides a normalized interface to the first storage management application to access any storage array under the control of the second storage management application. When the storage management operation is received from the first storage management application, the second storage management application translates the operation into the necessary interface calling syntax required by the native storage arrays. The second storage management application then causes the storage management operation to be executed on behalf of the originally requesting host. In this way, the first storage management application uses the features of the second storage management application, since the second storage management application includes features to directly translate and communicate with the native interfaces of the storage arrays.

Figure 3:
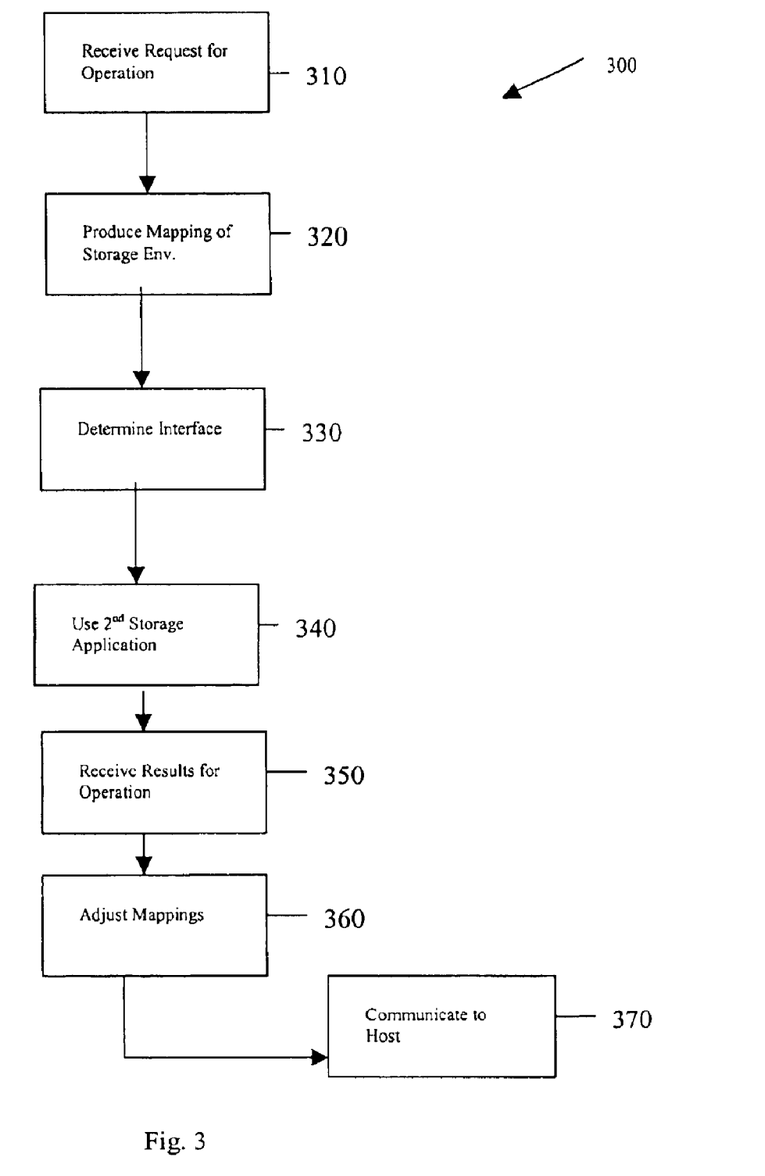
FIG. 3 shows a flowchart of another method to bridge storage management applications, according to the present invention.

FIG. 3 illustrates a flowchart of another method 300 to bridge storage management applications, according to the present invention. In 310, a request originated by a host is received by a first storage management application. The request is associated with a storage management operation to be executed within a shared storage environment within which the host, the first storage management application, a second storage management application, and one or more storage resources are networked.

After receiving the request, the first storage management application produces a mapping in 320 of the storage environment housing the storage resources associated with the storage management operation. During the creation of the mapping, or alternatively upon the conclusion of creating the mapping, the first storage management application determines that one or more storage resources necessary for processing the storage management operation is controlled by the second storage management application. The first storage management application then determines an interface that is necessary to communicate with the second storage management application in 330, and uses in 340 the second storage management interface to communicate the storage management operation to the second storage management application.

In 350, the second storage management application completes processing of the storage management operation passed by the first storage management application through the second storage management interface. Results associated with the conclusion of the processing are then communicated back to the first storage management application from the second storage management application. In some embodiments, the results are communicated through a mutually accessible data store or data structure, where the data store or data structure is accessible to both the first and second storage management applications. In other embodiments, the second storage management application interface is used by the second storage management application to communicate the results to the first storage management application. In this way, a bridge is created between the processing of the first and second storage management applications, so that the processing of each storage management application is utilized.

If the results of processing the storage management operation necessitate the updating of the mapping created by the first storage management application, then in 360 the mappings are adjusted as required by the first storage management application. In 370, the results and any updated mappings are communicated to the host from the first storage management application. In some embodiments, the second storage management application is a VM. In other embodiments, the storage resources are virtual storage resources such as virtual disks. Additionally, in one embodiment, the storage management operation is one or more of a frozen image operation, a backup operation, an operation to acquire storage resource status, an operation to acquire storage resource properties/configuration data, or others.

Figure 4:
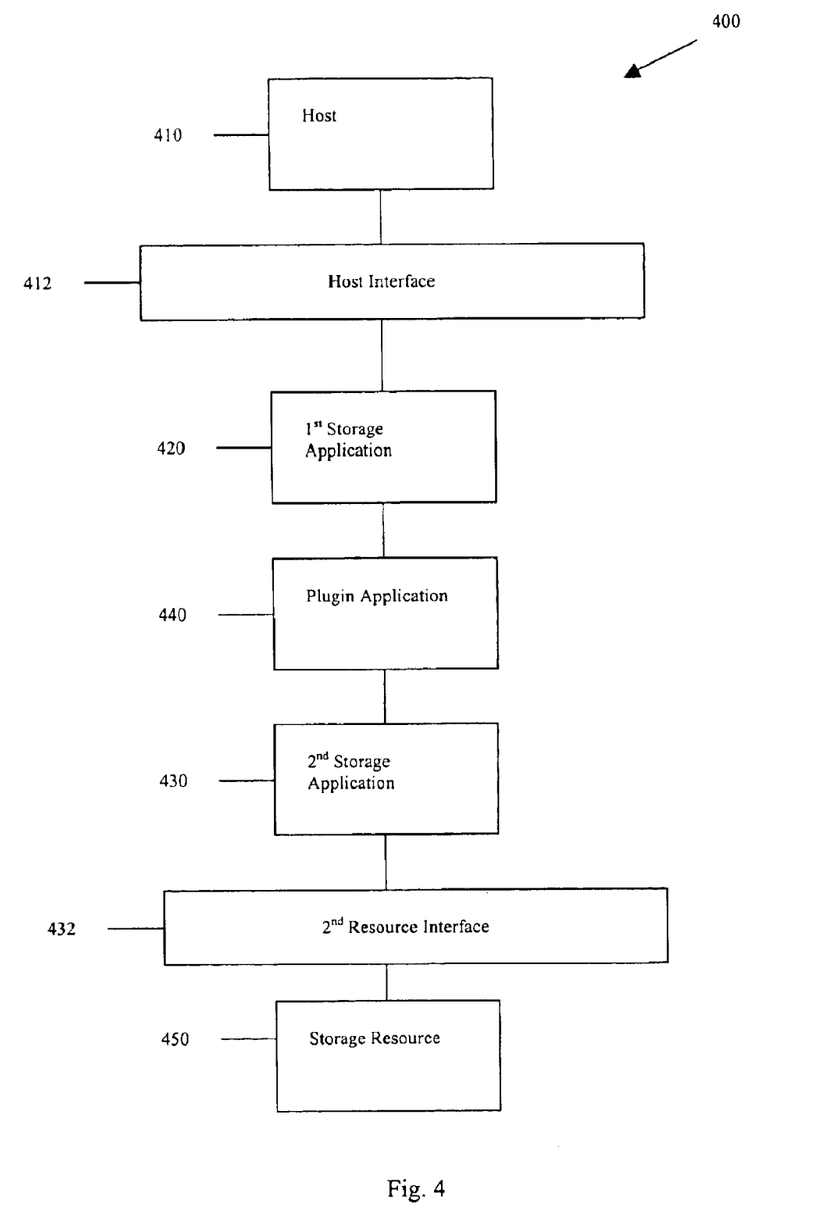
FIG. 4 shows a diagram of another storage management bridging system, according to the present invention.

FIG. 4 illustrates a diagram of another storage management bridging system 400, according to the present invention. The storage management bridging system 400 includes a host 410 having a host interface 412, a first storage management application 420, a second storage management application 430, and a plugin application 440. Moreover, the second storage management application 430 has direct access to a native storage resource interface 432 associated with performing storage management operations on a storage resource 450. The first storage management application 420 communicates with the host 410 through a host interface 412 provided by the first storage management application 420. Likewise, the second storage management application 430 communicates with the storage resource 450 through the storage resource interface 432.

The plugin application 440 acts as a software bridge between the processing of the first storage management application 420 and the second storage management application 430. The plugin application 440 is used by the first storage management application 420 to pass the storage management operation to the second storage management application 430 on behalf of the host 410. The second storage management application 430 can, in some embodiments, remain entirely transparent to the host 410. The second storage management application 430 then translates the storage management request or operation into a format accepted by the storage resource interface 432, where the storage management request or operation is preformed directly on the storage resource 450. Upon the conclusion of the processing of the storage management operation on the storage resource 450, the results associated with the processing are returned to first storage management application 420. In some embodiments, the results can be communicated to the first storage management application 420 through the plugin application 440, in other embodiments the results are communicated via a data store or a data structure (not shown in FIG. 4) that is accessible to the first storage management application 420. And, in one embodiment, if the results alter any mappings of the storage environment, then the first storage management application 420 uses the results to update the mappings accordingly.

In some embodiments, the plugin application 440 can be applications to acquire storage resource 450 properties, applications to acquire the frozen image techniques being used by the storage resource 450, applications to perform establish operations on the storage resource 450, applications to perform split operations on the storage resource 450, and the like. Moreover, in one embodiment, the storage resource 450 is a storage array whose native interface (e.g., storage resource interface 432) is controlled by the second storage management application 430.

As is now apparent to one of ordinary skill in the art upon reading the present disclosure, a software bridge can be used according to the teachings of the present disclosure to utilize and link two storage management applications operating in a shared storage environment. This is particularly useful to reduce the complexities of storage management applications and improve processing throughput of storage management operations in the shared storage environment.

CONCLUSION

The methods and systems discussed above permit more efficient bridging of storage management applications. Conventional approaches do not efficiently permit disparate storage management applications to be integrated with one another, such that the features of each disparate storage management application can be utilized within a shared or unshared storage environment, or such that features are not unduly duplicated between disparate storage management applications.

Conversely, the present invention provides plugin applications that bridge one storage management application with other storage management applications. In this way, the complexities of each storage management system are reduced and the advantages of each storage management system are fully utilized. Moreover, the plugin applications remain transparent to a host that issues storage management requests to access storage resources within the shared or unshared storage environment.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method to bridge storage management applications, comprising:

receiving a request to perform a storage management operation, wherein the storage management operation is received by a first storage management application from a host;

performing one or more analysis operations on a storage environment associated with the storage management operation, wherein the one or more analysis operations are performed by the first storage management application;

passing the storage management operation from the first storage management application to a second storage management application using an interface associated with the second storage management application, wherein the second storage management application performs the storage management operation on one or more storage resources included in the storage environment on behalf of the first storage management application; and receiving results associated with performing the storage management operation on the one or more storage resources, wherein the results are received by the first storage management application from the second storage management application, wherein in receiving the results, the results are received from a data store read by the first storage management application and written to by the second storage management application.

2. The method of claim 1 wherein in passing the storage management operation, the second storage management application translates the storage management operation from the interface associated with the second storage management application to one or more second interfaces associated with the one or more storage resources.

3. The method of claim 2, wherein in passing the storage management operation, the one or more storage resources are storage arrays accessible in the storage environment.

4. The method of claim 1, wherein in performing the one or more analysis operations, the one or more analysis operations provide a mapping of the storage environment.

5. The method of claim 4, further comprising using the mapping and results returned from the second storage management application that are associated with the storage management operation to satisfy processing of the storage management operation for the host.

6. A method to bridge storage management applications, comprising:

receiving a request from a host interface to perform a storage management operation on a storage resource, wherein the host interface is used by the host to communicate with a first storage management application;

producing a mapping of a storage environment housing the storage resource, wherein the mapping is produced by the first storage management application;

determining that an interface to perform the storage management operation is controlled by a second storage management application;

using a second storage management application interface to communicate the storage management operation to the second storage management application;

receiving results from the second storage management application when the second storage management application processes the storage management operation on the storage resource, wherein the results are received by the first storage management application and the first storage management application uses the results to generate or adjust the mappings of the storage environment that are altered by the results; and communicating the generated or adjusted mappings to the host through the host interface.

7. The method of claim 6, wherein in receiving the request, the storage management operation is a frozen image operation.

8. The method of claim 6, wherein in receiving the request, the storage resource is a virtual storage resource.

9. The method of claim 6, wherein in receiving the request, the storage environment includes a storage area network (SAN) environment.

10. The method of claim 6 wherein in determining, the second storage management application is a Volume Manager (VM) application.

11. The method of claim 6 wherein in receiving the results, the results are received in one or more data structures accessible to the first management application.

12. A storage management bridging system, comprising:

a host;

a first storage management application that communicates with the host;

a second storage management application that communicates with a storage resource interface associated with a storage resource;

a plugin application used by the first storage management application to access the second storage management application on behalf of the host, wherein the plugin application permits the first storage management application to cause the second storage management application to access the storage resource interface to perform a storage management operation requested by the host; and a database, wherein the database houses results obtained by the second storage management application associated with performing the storage management operation, and wherein the database is accessible to the first storage management application to acquire the results.

13. The system of claim 12, wherein the results are used by the first storage management application to generate or update mappings associated with a storage environment of the host.

14. The system of claim 12, wherein the first storage management application performs an analysis of a storage environment associated with the host when receiving the storage management operation requested by the host before accessing the plugin application.

15. The system of claim 12, wherein the plugin application is associated with at least one of a storage resource properties retrieval application, an obtain frozen image technique application, an establish operation, and a split operation.

16. The system of claim 12, wherein the first storage management application accesses the plugin application when the storage resource is associated with a storage array.

17. A method to bridge storage management applications, comprising:

receiving a request from a host interface to perform a storage management operation on a storage resource, wherein the host interface is used by the host to communicate with a first storage management application;

producing a mapping of a storage environment housing the storage resource, wherein the mapping is produced by the first storage management application;

determining that an interface to perform the storage management operation is controlled by a second storage management application, wherein the second storage management application is a Volume Manager (VM) application;

using a second storage management application interface to communicate the storage management operation to the second storage management application;

receiving results from the second storage management application when the second storage management application processes the storage management operation on the storage resource, wherein the results are received by the first storage management application and the first storage management application uses the results to generate or adjust the mappings of the storage environment that are altered by the results.

18. A storage management bridging system, comprising:

a host;

a first storage management application that communicates with the host;

a second storage management application that communicates with a storage resource interface associated with a storage resource; and a plugin application used by the first storage management application to access the second storage management application on behalf of the host, wherein the plugin application permits the first storage management application to cause the second storage management application to access the storage resource interface to perform a storage management operation requested by the host;

wherein the first storage management application performs an analysis of a storage environment associated with the host when receiving the storage management operation requested by the host before accessing the plugin application.

19. A storage management bridging system, comprising:

a host;

a first storage management application that communicates with the host;

a second storage management application that communicates with a storage resource interface associated with a storage resource; and a plugin application used by the first storage management application to access the second storage management application on behalf of the host, wherein the plugin application permits the first storage management application to cause the second storage management application to access the storage resource interface to perform a storage management operation requested by the host, and wherein the plugin application is associated with at least one of a storage resource properties retrieval application, an obtain frozen image technique application, an establish operation, and a split operation.

20. A storage management bridging system, comprising:

a host;

a first storage management application that communicates with the host;

a second storage management application that communicates with a storage resource interface associated with a storage resource; and a plugin application used by the first storage management application to access the second storage management application on behalf of the host, wherein the plugin application permits the first storage management application to cause the second storage management application to access the storage resource interface to perform a storage management operation requested by the host;

wherein the first storage management application accesses the plugin application when the storage resource is associated with a storage array.

* * * * *